(12) United States Patent
Bradley

(10) Patent No.: US 10,919,461 B2
(45) Date of Patent: Feb. 16, 2021

(54) FLEXIBLE MEMBERS FOR SEALING, BAFFLING, OR REINFORCING

(71) Applicant: Zephyros, Inc., Romeo, MI (US)

(72) Inventor: Jeffrey A. Bradley, Columbiaville, MI (US)

(73) Assignee: Zephyros, Inc., Romeo, MI (US)

( * ) Notice: Subject to any disclaimer, the term of this patent is extended or adjusted under 35 U.S.C. 154(b) by 106 days.

(21) Appl. No.: 16/083,908

(22) PCT Filed: Mar. 16, 2017

(86) PCT No.: PCT/US2017/022701
§ 371 (c)(1),
(2) Date: Sep. 11, 2018

(87) PCT Pub. No.: WO2017/161114
PCT Pub. Date: Sep. 21, 2017

(65) Prior Publication Data
US 2019/0100251 A1    Apr. 4, 2019

Related U.S. Application Data

(60) Provisional application No. 62/309,054, filed on Mar. 16, 2016.

(51) Int. Cl.
*B60R 13/08* (2006.01)
*F16J 15/06* (2006.01)
(Continued)

(52) U.S. Cl.
CPC ........ *B60R 13/0815* (2013.01); *B29C 44/188* (2013.01); *B62D 29/002* (2013.01);
(Continued)

(58) Field of Classification Search
CPC ..... B60R 13/08; B60R 13/0815; B62D 25/24; B62D 29/002; F16J 15/02; F16J 15/064; F16J 15/068
(Continued)

(56) References Cited

U.S. PATENT DOCUMENTS

| 4,751,249 A | 6/1988 | Wycech |
| 4,901,500 A | 2/1990 | Wycech |

(Continued)

FOREIGN PATENT DOCUMENTS

| CN | 1447756 A | 10/2003 |
| CN | 1798820 A | 7/2006 |

(Continued)

OTHER PUBLICATIONS

Chinese First Office Action dated Nov. 5, 2019, Application No. CN201780018006.3.

(Continued)

*Primary Examiner* — Jason S Daniels
(74) *Attorney, Agent, or Firm* — The Dobrusin Law Firm, PC

(57) ABSTRACT

An article comprising: (a) a carrier; (b) one or more carrier extensions extending from the carrier at one or more joints; (c) activatable material disposed on the carrier, at least one of the one or more carrier extensions, or a combination thereof; wherein the one or more carrier extensions are flexible relative to the carrier at the one or more hinges.

20 Claims, 1 Drawing Sheet

(51) Int. Cl.
 *B29C 44/18* (2006.01)
 *B62D 29/00* (2006.01)
(52) U.S. Cl.
 CPC ........... *F16J 15/064* (2013.01); *F16J 15/068* (2013.01); *B29K 2995/0002* (2013.01); *B60R 2013/0807* (2013.01)
(58) Field of Classification Search
 USPC ............................................ 296/39.3, 187.02
 See application file for complete search history.

(56) References Cited

U.S. PATENT DOCUMENTS

| | | | |
|---|---|---|---|
| 5,755,486 A | 5/1998 | Wycech | |
| 6,233,826 B1* | 5/2001 | Wycech | ................. A61B 8/485 29/897.1 |
| 6,358,584 B1* | 3/2002 | Czaplicki | ............. B62D 29/002 138/106 |
| 7,140,668 B2* | 11/2006 | Wesch | ................. B62D 29/002 296/187.02 |
| 7,249,415 B2 | 7/2007 | Larsen et al. | |
| 7,428,774 B2 | 9/2008 | Thomas | |
| 7,597,382 B2 | 10/2009 | Vilcek | |
| 7,784,186 B2 | 8/2010 | White et al. | |
| 2003/0218019 A1* | 11/2003 | Le Gall | ................ B62D 29/002 220/560.12 |
| 2004/0262853 A1 | 12/2004 | Larsen | |
| 2007/0045866 A1 | 3/2007 | Gray | |
| 2007/0138683 A1* | 6/2007 | Kanie | ..................... B60R 13/08 264/51 |
| 2008/0111394 A1 | 5/2008 | Lewis | |
| 2009/0223739 A1 | 9/2009 | Duffin | |
| 2009/0233055 A1 | 9/2009 | White | |
| 2011/0241383 A1* | 10/2011 | Shin | ..................... B62D 29/002 296/193.06 |
| 2011/0262735 A1 | 10/2011 | Hoefflin | |
| 2014/0087126 A1 | 3/2014 | Quaderer | |
| 2014/0138388 A1 | 5/2014 | Synnestvedt | |

FOREIGN PATENT DOCUMENTS

| | | |
|---|---|---|
| CN | 102164809 A | 8/2011 |
| CN | 103216274 A | 7/2013 |
| DE | 202007018160 U1 | 5/2008 |
| WO | 00/55444 A1 | 9/2000 |
| WO | 01/83206 A1 | 11/2001 |
| WO | 2007/019330 A1 | 2/2007 |
| WO | 2016/176459 A1 | 11/2016 |

OTHER PUBLICATIONS

Search Report dated Oct. 28, 2019, Application No. CN201780018006.3.
Search Report & Written Opinion dated May 30, 2017, Application No. PCT/US2017/022701.

* cited by examiner

FLEXIBLE MEMBERS FOR SEALING, BAFFLING, OR REINFORCING

FIELD

The present disclosure relates generally to a flexible member, which may find particularly use in sealing, noise/vibration reduction, structural reinforcement, or a combination thereof. The present disclosure may specifically relate to a flexible member which may find particular use in sealing, noise/vibration reduction, structural reinforcement, or a combination thereof in cavities.

BACKGROUND

Industries, such as the automotive industry, rely on devices for baffling, sealing, or reinforcing. Such members typically include an activatable material, such as an expandable material, which may be combined with other components for forming a seal, a baffle, a structural reinforcement or the like in a cavity, such as cavity of an automotive vehicle. U.S. Pat. Nos. 7,784,186; 7,249,415; 5,755,486; 4,901,500; and 4,751,249, each of which is incorporated by reference, describe exemplary prior art devices for baffling, sealing, or reinforcing.

Many of these members may include one or more extensions to direct or guide expandable material within a cavity. These members may need to be designed and configured specifically to fit into particular cavity sizes and shapes. These members may be rigid once exposed to an activation condition, such that one or more cavities in which they are installed are also rendered immobile relative to other cavities. There is a continuous need in the industry to provided improved devices which provide for better installation within varying tolerances, more rapid activation of the activatable material, and provide for installation in a variety of cavity configurations. There is a need to provide for baffling, sealing, or reinforcing which can also provide one or more joints.

SUMMARY

The present disclosure relates to an article comprising (a) a carrier; (b) one or more carrier extensions extending from the carrier at one or more joints; (c) activatable material disposed on the carrier, at least one of the one or more carrier extensions, or a combination thereof; wherein the one or more carrier extensions are flexible relative to the carrier at the one or more hinges.

In some preferred embodiments, the article of the disclosure may include one or more hinges along a length of the carrier, at least one of the one or more carrier extensions, or both. In some preferred embodiments, the one or more hinges may be at least one of the one or more joints.

The present disclosure relates to a method for forming an article, the method comprising: (a) providing a carrier material; (b) forming the carrier and the one or more carrier extensions from the carrier material; and (c) extruding an activatable material on at least a portion of the carrier material.

In some preferred embodiments, the method may include installing the article into a cavity by flexing the carrier, the one or more carrier extensions, or a combination thereof such that the article confirms with a shape of the cavity. In some preferred embodiments, the method may include flexing the carrier at least at one of the one or more hinges during installation to conform the article to the cavity. In some preferred embodiments, at least one of the one or more carrier extensions may be inserted into a first cavity and at least another of the one or more carrier extensions is inserted may be inserted into a second cavity.

The article and method of the disclosure may resolve the need to provide for a baffling, sealing, or structural reinforcement device which is able to conform to a variety of cavity shapes and sizes through flexibility of one or more carrier extensions. The article and method of the disclosure may resolve the need to reinforce one or more cavities by providing for activatable material which expands within the one or more cavities. The article and method of the disclosure may provide for one or more joints by having one or more hinges formed in the article.

DETAILED DESCRIPTION

Figure 1:
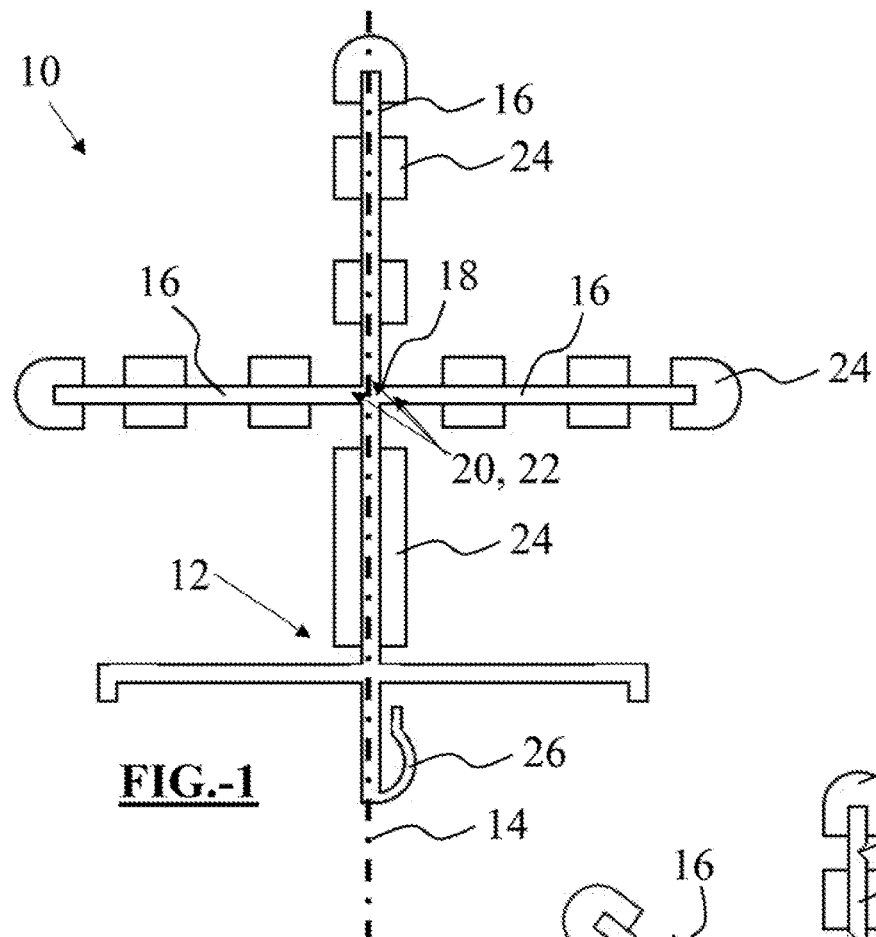
FIG. 1 illustrates a cross-section view of an exemplary member having hinges according to the teachings herein.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/309,054, filed Mar. 16, 2016, the entirety of the contents of that application are hereby incorporated by reference herein for all purposes.

The disclosure relates to an article which may be a flexible member for providing baffling, sealing, reinforcing, or a combination thereof to an article of manufacture. The member may include a carrier; one or more carrier extensions extending from the carrier, activatable material disposed on the carrier, the one or more carrier extensions, or a combination thereof. The member may be flexible about one or more hinges where at least one of the one or more carrier extensions is flexible relative to the carrier. The member may specifically be adapted to provide sealing, baffling or reinforcement within a structure's cavity. The member may find a particular benefit in conforming to a variety of cavity sizes and shapes. For example, a single configuration of the member may provide sealing, baffling, or reinforcement to multiple cavity configurations by conforming to each cavity configuration by flexing, bending, or deforming about the one or more joints. For example, a single configuration of the member may provide sealing, baffling, or reinforcement for multiple cavity structures by having at least one carrier extension inserted into an individual cavity structure, such that multiple cavity structures each receive and are reinforced by at least one carrier extension. It is contemplated that the member may be applied (e.g., assembled) to various articles of manufacture such as boats, trains, buildings, homes, furniture, or the like. It has been found however, that the member is particularly suitable for application to automotive vehicles.

The article of the disclosure may further comprise any one or more of the features described in this specification in any combination, including the preferences and examples listed in this specification, and including the following features: at least one of the one or more hinges may be located along a length of the carrier, at least one of the one or more carrier extensions, or both; at least one of the one or more hinges may be at least one of the one or more joints; the carrier may include one or more fasteners; the carrier, the one or more carrier extensions, or a combination thereof may be flexible along a plurality of axes, plurality of planes, or both; the activatable material may be a heat activatable material; one or more of the joints may be integrally formed in the article so that at least one of the one or more carrier extensions may be integral with the carrier; at least one of the one or more hinges may be a living hinge; at least one of the one or more carrier extensions may be connected to, located onto, or received by the carrier at one of the one or more hinges; an end of at least one of the one or more carrier extensions may be covered with the activatable material; at least one of the one or more hinges may be free of the activatable material; at least one of the one or more hinges may be at least partially covered with the activatable material; at least one of the one or more carrier extensions may lie in one same plane as at least another of the one or more carrier extensions; at least one of the one or more carrier extensions may lie in a different plane as at least another of the one or more carrier extensions.

The article of the disclosure includes a carrier. The carrier may function to affix the article to at least surface, provide a base for one or more carrier extensions, provide a surface carrying activatable material, guide the expansion of activatable material, or a combination thereof. The carrier may have a longitudinal axis. The carrier may include one or more curved portions. The carrier may be rigid, flexible, or a combination of both rigid portions and flexible portions. The carrier may be flexible or have flexible portions and thus may be formed to facilitate movement of the carrier and/or one or more carrier extensions along more than one axis. The carrier may include portions having a material thickness that is greater than the material thickness at other portions of the carrier. The portions having a greater thickness may be arranged in a position that is substantially parallel to or substantially perpendicular to a portion having a smaller thickness. The carrier may include an activatable material which may be located only onto select portion of the carrier. The activatable material may substantially enclose the entirety of the carrier. The carrier may have a central portion. A portion of the carrier, such as a central portion or an end segment, may split into two distinct split portions. Split portions of the carrier may be substantially parallel to one another or may be arranged in a non-parallel relationship. The split portions may be located at a terminating end of the carrier. The split portions may be formed such that they act as a fastener for locating the carrier in a desired location such that the split portions are located into and/or through an opening or receive a surface. Portions of the carrier may be located in different planes from one another. One or more of the carrier extensions may include protrusions which extend into the activatable material, such as to aid in retaining the activatable material on the carrier extension. The carrier may be attached to or integral with one or more fasteners, one or more extensions, one or more segments of activatable material, or a combination thereof. A portion of the carrier, such as the central portion, may bisect one or more extensions.

The carrier may include one or more carrier extensions. The one or more carrier extensions may affix the article to at least one surface, one or more cavities, or both. The one or more carrier extensions may deform, such as at one or more hinges, to allow the article to conform to a variety of cavity sizes and shapes. The one or more carrier extensions may carry activatable material, guide the expansion of activatable material. The extensions may be of differing length or may be substantially similar in length. A first extension having a first length may be located in between two adjacent second extensions having a length that is shorter than the first lengths. Alternatively, a first extension may have a first length that is shorter than the length of one or more adjacent extensions. The carrier may have extensions that extend away from one another or toward one another. The one or more carrier extensions may be rigid, flexible, or include both rigid portions and flexible portions. The one or more carrier extensions may each be entirely flexible, with include portions having greater flexibility than other portions. The one or more extensions may extend from a central portion of the carrier, which central portion may be in substantial alignment with the longitudinal axis. The one or more extensions may be connected or affixed to the carrier at one or more joints. The one or more extensions may be separate from or integral with the carrier. The one or more extensions may extend from the carrier along any length of the carrier. The one or more extensions may be arranged in a substantially perpendicular arrangement with the central portion of the carrier. Alternatively, the one or more extensions may extend from the central portion of the carrier at a skew angle. The carrier may include extensions that extend at both skew and perpendicular angles. One or more of the carrier extensions may lie in the same plane, differing plane, or both as one or more other carrier extensions. One or more of the carrier extensions may include activatable material thereon. The area between one or more extensions may be substantially free of any activatable material. Alternatively, the area between one or more extensions may be substantially filled with activatable material, or may be only partially filled with activatable material. One or more of the carrier extensions may include protrusions which extend into the activatable material, such as to aid in retaining the activatable material on the carrier extension. The carrier may include one, two, three, four, five, six, eight, ten or more carrier extensions or any number therebetween. The carrier may include twenty, eighteen, sixteen, fifteen or less carrier extensions or any number therebetween. The one or more carrier extensions may be inserted into the same cavity or one or more of each of the individual carrier extensions may be inserted into one or more separate cavities. For example, all of the carrier extensions may be inserted into the same cavity as the carrier. For example, a first extension may be placed into a first cavity, a second extension into a third cavity, and a fourth extension into a fourth cavity. The one or more carrier extensions may be inserted into one or more individual cavities to facilitate bending or movement of the one or more individual cavities in relation to other cavities or surfaces, while simultaneously providing for sealing, baffling, and/or structural reinforcement to each of the individual cavities. The carrier extensions may flex, bend, deform, or the like about one or more hinges.

The article may include one or more hinges. The one or more hinges may facilitate and/or guide flexing of the carrier, the carrier extensions, or both. The one or more hinges may allow or facilitate the article to conform to the shape and/or size of one or more cavities into which the article may be inserted and/or installed. The one or more hinges may include a single hinge or a plurality of hinges. The one or more hinges may be free of any bending or flexing along the hinge until pressure is applied to one or more portions of the carrier, carrier extensions, or any combination thereof. The one or more hinges may bend or flex under their own weight without the application of additional pressure. The one or more hinges may bend under the weight of the carrier, one or more carrier extensions, or both by about 10 degrees, 30 degrees, 45 degrees, 90 degrees, or more, or any degree in between. The one or more hinges may bend under the weight of the carrier, one or more carrier extensions, or both by about 180 degrees, 160 degrees, 150 degrees, 135 degrees, or less, or any degree in between. The one or more hinges may be formed as joints, notches, indents, weak points, areas of the carrier and/or the carrier extensions substantially free of activatable material, living hinges, the like, or any combination thereof. Placement of the activatable material to achieve or support one or more hinges can be understood from U.S. patent application Ser. No. 13/804,840, incorporated by reference herein for all purposes. The one or more hinges may be formed by portions of the carrier, carrier and/or extensions having a thinner cross-section than adjacent portions of the carrier and/or carrier cross-section. The one or more hinges may be formed by portions of the carrier and/or carrier extensions having a preformed curved shape. The one or more hinges may be located along a length of one or more of the carrier extensions, the carrier, or both. The one or more hinges may be formed at or may be the one or more joints where one or more carrier extensions extend from the carrier. The carrier, one or more carrier extensions, or both may each have one, two, three, four, five, six, eight, ten or more hinges or any number therebetween. The carrier, one or more carrier extensions, or both may include twenty, eighteen, sixteen, fifteen or less hinges or any number therebetween. The hinges may allow the carrier, one or more carrier extensions, or both to bend into an acute angle about the hinge. The hinges may allow bending of each carrier extension at the hinge to an angle about less than 90 degrees, about less than 75 degrees, about less than 50 degrees, about less than 45 degrees, about less than 10 degrees, or even less, or any degree therebetween. The hinges may allow bending of each carrier extension to an angle about more than 1 degree, about more than 3 degrees, about more than 5 degrees, or even more, or any degree therebetween.

The article may include activatable material located on the carrier, one or more carrier extensions, or any combination thereof. The activatable material may be located onto substantially the entirety of the carrier or alternatively may be located onto only portions of the carrier. The activatable material may be located onto substantially the entirety of one or more of the carrier extensions or alternatively may be located onto only portions of one or more of the carrier extensions. The activatable material may substantially entirely enclose the entirety of the carrier, one or more carrier extensions, or any combination thereof. Alternatively, the activatable material may substantially enclose only portions of the carrier, portions of one or more carrier extensions, or any combination thereof. The activatable material may extend beyond an end of the carrier. Alternatively, the activatable material may be substantially coextensive with an end of the carrier. The activatable material may be located onto any portion of the article, such as the carrier, that forms a fastener. The activatable material may substantially enclose any portion of the article, such as the carrier, which forms a fastener. Any portion of the carrier which forms a fastener may also be substantially free of any activatable material. The activatable material may be located on one or more hinges or alternatively, one or more hinges may be substantially free of any activatable material. The activatable material itself may be formed to have a curved profile. In the event that the activatable material is not co-extensive with the carrier, the activatable material that extends beyond an end of the carrier may be curved. Any angle of curvature for one or more of the carrier and activatable material may be selected based upon the intended location of the device which may depend upon the shape of a cavity into which the device is to be located. The carrier and/or activatable material may be curved in a single direction or may be curved in multiple directions. The curve may form a substantially u-shaped or substantially v-shaped device.

The article may include one or more fasteners. The one or more fasteners may function to affix the carrier to a surface, such as a wall of a cavity. The one or more fasteners may be integrally formed with the carrier and/or one or more carrier extensions or separately formed from the carrier and/or one or more carrier extensions. The carrier may include one or more fasteners that are located so that they correspond with openings formed in a wall. The carrier may include a single fastener to be located into a wall opening or a plurality of fasteners located adjacent one another to be located into a plurality of adjacent wall openings. The one or more fasteners may include a fir tree fastener, arrowhead fastener, push pin fastener, clip fastener, the like, or any combination thereof. The fastener may be an arrowhead fastener whereby one or more terminal ends of the arrowhead include surfaces formed to contact and exert a force on a surface adjacent an opening in wall. The fastener may be shaped to include surfaces that lie in direct planar contact with a surface that lies adjacent an opening (e.g., an opening into which the fastener is located). The article may include a single fastener or a plurality of fasteners. The one or more fasteners may be into and/or through an opening of a surface, such as a cavity wall, to affix the article. The one or more fasteners may receive a surface, such as a protrusion from a cavity wall, to affix the article. A carrier including multiple fasteners may be formed so that a first fastener is located in a first plane and a second fastener is located in a second plane that is the same or different from the first plane. A plurality of fasteners may be arranged parallel to one another. The plurality of fasteners may be arranged such that a first fastener may be perpendicular to a second fastener. The carrier may have sufficient flexibility so that prior to insertion into openings, a first fastener and second fastener may be located parallel to one another (e.g., in a first position relative to each other), but during use and upon insertion into openings, the first and second fasteners are located in a non-parallel relationship relative to each other (e.g., in a second position relative to each other).

At least a portion of the carrier, one or more carrier extensions, or any combination thereof may have a thin profile (e.g., a profile that is thinner than adjacent portions of the carrier and/or carrier extension). The thin profile portion may be such that it can be located in areas where the surface upon which the carrier is located must remain substantially flat. The thin profile portion may be connected to a fastener having a substantially thicker profile such that the thickness of the fastener assists in maintaining the thin profile portion in a flat position on a surface adjacent the fastener.

Formation of the member of the disclosure may include a variety of processing steps depending on the desired configuration of the member. In any event, it is generally contemplated that the carrier, the one or more carrier extensions, and the activatable material may be manually attached to each other, automatically attached to each other, or a combination thereof. Moreover, various processes such as molding (e.g., compression, injection, or other molding), extrusion, pultrusion, or the like may be used to form the carrier, the activatable material, the one or more fasteners, the one or more carrier extensions, the one or more activatable material extensions, and such processes may be employed to attach these components together. One or more of the carrier and/or activatable material may be formed in processes disclosed in U.S. Provisional Application No. 62/074,237, incorporated by reference herein for all purposes.

The method of forming the member of the disclosure may comprise providing a carrier material, forming the carrier and the one or more carrier extensions from the carrier material, and extruding and/or pultruding an activatable material on at least a portion of the carrier material, whereby the activatable material may be co-extruded and/or pultruded with the carrier material.

The method of forming the member of the disclosure may further comprise any one or more of the following steps or features described in this specification in any combination, including the preferences and examples listed in this specification, and including the following: installing the article into a cavity by flexing the carrier, the one or more carrier extensions, or any combination thereof such that the article may conform with a shape of the cavity; the carrier, the one or more carrier extensions, or any combination thereof may be flexed about at least one of the one or more hinges during installation of the article into a cavity; the carrier, the one or more extensions, or any combination may be flexed about one or more hinges which may be located where at least one or more extensions extend from the carrier; at least one of the one or more carrier extensions may be inserted into a first cavity and at least another of the one or more carrier extensions may be inserted into a second cavity; activating the activatable material so that it may expand and substantially fill one or more cavities; a first cavity may be able to move relative to a second cavity after the activatable material has been activated; the carrier material may be provided by extrusion; at least a portion of the carrier material may be simultaneously extruded with at least a portion of the activatable material; at least one fastener may be integrally formed from the carrier material with the carrier, at least one of the one or more carrier extensions, or a combination thereof; at least one fastener may be separately attached to the carrier, at least one of the one or more carrier extensions, or a combination thereof; installing the member into the cavity, such as a vehicle cavity; and the activatable material and/or the carrier material may be further extruded to form a profile configuration.

The carrier may comprise a polymeric material, a metallic material, or a combination thereof. The carrier may comprise a composite material, a woven material, or a combination thereof. The activatable material may comprise an epoxy. One or more of the carrier material and/or activatable material may comprise a composite article that is formed by contacting an epoxy/amine reaction product material (e.g., a material that is a reaction product of a diepoxide and a primary amine, such as monoethanolamine, or the reaction product of a diepoxide resin (e.g., BPA), a mono primary amine, a di-secondary amine, a dimer captan and/or a di-carboxylic acid) during a step of extrusion, injection molding, pultrusion or any combination thereof. The contacting may be only after the reaction has completed between the epoxy and the amine (e.g., only after the reaction of epoxy and amine), as described in U.S. Provisional Application No. 62/130,908, incorporated by reference herein for all purposes.

ILLUSTRATIVE EMBODIMENTS

The following descriptions of the Figures are provided to illustrate the teachings herein, but are not intended to limit the scope thereof.

FIG. 1 illustrates a cross-section of a member 10 according to the teachings herein. The member 10 includes a carrier 12 having a longitudinal axis 14. The member includes a plurality of carrier extensions 16. The carrier extensions 16 extend from the carrier 12. The carrier extensions 16 may extend from any portion of the carrier 12 and are illustrated extending from a central portion 18 of the carrier 12. The carrier extensions 16 may extend from the carrier at one or more joints 20. At least one of the carrier extensions 16 may lie in the same plane another carrier extension 16, and may simultaneously lie in a differing plane as another carrier extensions 16. The carrier extensions 16 may be flexible relative to the carrier 12 at one or more hinges 22. The one or more hinges 22 may be located at the one or more joints 20 and/or the central portion 18 of the carrier 12. Activatable material 24 may be dispose don the carrier 12, at least one of the carrier extensions 16, or both. The activatable material 24 may be disposed along a length, an end, or both of at least one of the carrier extensions 16 and/or the carrier 12. The carrier 12 may include one or more fasteners 26, which may affix the member to a wall of a cavity.

Figure 2:
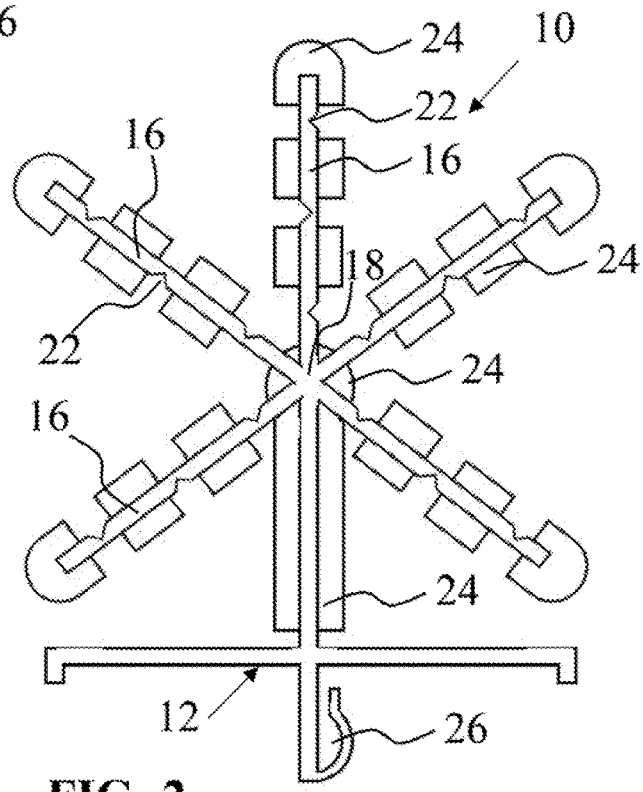
FIG. 2 illustrates a cross-section view of an exemplary member having hinges along the lengths of carrier extension according to the teachings herein.

FIG. 2 illustrates a cross-section of a member 10 according to the teachings herein. The member 10 includes a carrier 12 having a longitudinal axis 14. The member includes a plurality of carrier extensions 16. The carrier extensions 16 extend from the carrier 12. The carrier extensions 16 may extend from any portion of the carrier 12 and are illustrated extending from a central portion 18 of the carrier 12. The carrier extensions 16 may extend from the carrier at one or more joints 20. At least one of the carrier extensions 16 may lie in the same plane another carrier extension 16, and may simultaneously lie in a differing plane as another carrier extensions 16. The carrier extensions 16 may be flexible relative to the carrier 12 at one or more hinges 22. The one or more hinges 22 may be located at the one or more joints 20 and/or the central portion 18 of the carrier 12. Activatable material 24 may be disposed on the carrier 12, at least one of the carrier extensions 16, or both. The activatable material 24 may be disposed on a central portion 18 of the carrier 12, may be disposed on the one or more joints 20, or both. The activatable material 24 may be disposed along a length, an end, or both of at least one of the carrier extensions 16 and/or the carrier 12. At least some of the one or more hinges 22 may be substantially free of activatable material 24. The carrier 12 may include one or more fasteners 26, which may affix the member to a wall of a cavity.

LISTING OF REFERENCE NUMERALS

10 Member
12 Carrier
14 Longitudinal axis
16 Carrier extension
18 Central portion 20 One or more joints
22 One or more hinges
24 Activatable material
26 One or more fasteners Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. An article comprising:
   a) a carrier;
   b) two or more carrier extensions extending from the carrier at one or more joints, each joint including at least one hinge;
   c) portions of activatable material disposed on multiple distinct portions of at least one of the two or more carrier extensions, each distinct portion separated by at least one hinge and at least one portion of activatable material extending beyond a terminating end of at least one of the two or more carrier extensions, wherein the one or more hinges are substantially free of any activatable material;
   wherein prior to activation, each portion of activatable material lies in direct contact with only one of the two or more carrier extensions;
   wherein the two or more carrier extensions are flexible relative to the carrier at the one or more hinges; and
   wherein at least one of the two or more carrier extensions lie in a different plane as at least another of the two or more carrier extensions.

2. The article of claim 1, wherein at least one of the one or more hinges is located along a length of the carrier, at least one of the two or more carrier extensions, or both.

3. The article of claim 1, wherein the carrier includes one or more fasteners.

4. The article of claim 1, wherein the carrier, the two or more carrier extensions, or a combination thereof are flexible along a plurality of axes, plurality of planes, or both.

5. The article of claim 1, wherein the activatable material is a heat activatable material.

6. The article of claim 1, wherein one or more of the joints are integrally formed in the article so that at least one of the two or more carrier extensions are integral with the carrier.

7. The article of claim 1, wherein at least one of the one or more hinges is a living hinge.

8. The article of claim 1, wherein at least one of the two or more carrier extensions is connected to, located onto, or received by the carrier at one of the one or more hinges.

9. The article of claim 1, wherein at least one of the two or more carrier extensions lie in one same plane as at least another of the one or more carrier extensions.

10. A method of forming the article of claim 1, the method comprising:
    a) providing a carrier material;
    b) forming the carrier, the two or more carrier extensions, the one or more joints and the at least one hinge from the carrier material;
    c) extruding portions of activatable material on at least a portion of the carrier material, so that the hinges are substantially free of any activatable material and each portion of activatable material lies in direct contact with only one of the two or more carrier extensions.

11. The method of claim 10 including a step of installing the article into a cavity by flexing the carrier, the two or more carrier extensions, or a combination thereof such that the article conforms with a shape of the cavity.

12. The method of claim 10, including flexing the carrier, the two or more carrier extensions, or a combination thereof about at least one of the one or more hinges during installation of the article into a cavity.

13. The method of claim 11, wherein the carrier, the two or more carrier extensions, or a combination thereof are flexed about at least one or more hinges located where at least one or more carrier extensions extend from the carrier.

14. The method of claim 10, wherein at least one of the two or more carrier extensions is inserted into a first cavity and at least another of the one or more carrier extensions is inserted into a second cavity.

15. The method of claim 14, including a step of activating the activatable material so that it expands and substantially fills the first and second cavities.

16. The method of claim 14, wherein the first cavity is able to move relative to the second cavity after the activatable material has been activated.

17. The method of claim 10, wherein the carrier material is provided by extrusion.

18. The method of claim 10, including extruding at least a portion of the carrier material simultaneously with at least a portion of the activatable material.

19. The method of claim 10, including integrally forming at least one fastener from the carrier material with the carrier, at least one of the two or more carrier extensions, or a combination thereof.

20. The article of claim 1, wherein the carrier includes a central portion where each carrier extension meets.

* * * * *